United States Patent
Sim et al.

(10) Patent No.: US 12,423,298 B2
(45) Date of Patent: Sep. 23, 2025

(54) SYSTEM FOR CLASSIFYING DATA BASED ON A CLASSIFICATION ALGORITHM AND METHOD OF OPERATING THE SAME

(71) Applicant: SK hynix Inc., Icheon-si (KR)

(72) Inventors: Joon Seop Sim, Icheon-si (KR); Eui Cheol Lim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 83 days.

(21) Appl. No.: 18/168,045

(22) Filed: Feb. 13, 2023

(65) Prior Publication Data
US 2024/0045861 A1    Feb. 8, 2024

(30) Foreign Application Priority Data
Aug. 8, 2022   (KR) .................... 10-2022-0098576

(51) Int. Cl.
G06F 16/2453     (2019.01)
G06F 18/2413     (2023.01)

(52) U.S. Cl.
CPC .... G06F 16/2453 (2019.01); G06F 18/24147 (2023.01)

(58) Field of Classification Search
CPC ................. G06F 16/2453; G06F 18/24147
See application file for complete search history.

(56) References Cited

U.S. PATENT DOCUMENTS

| | | | | |
|---|---|---|---|---|
| 5,857,179 A | * | 1/1999 | Vaithyanathan | G06F 16/355 |
| 5,974,412 A | * | 10/1999 | Hazlehurst | G06F 16/3332 |
| | | | | 707/999.102 |
| 6,523,026 B1 | * | 2/2003 | Gillis | G06F 16/332 |
| 6,611,825 B1 | * | 8/2003 | Billheimer | G06F 16/313 |
| | | | | 707/E17.084 |
| 6,701,305 B1 | * | 3/2004 | Holt | G06F 16/31 |
| | | | | 707/E17.084 |
| 7,966,327 B2 | * | 6/2011 | Li | G06F 16/583 |
| | | | | 707/737 |
| 2003/0208485 A1 | * | 11/2003 | Castellanos | G06F 16/3326 |
| | | | | 707/999.005 |
| 2013/0054612 A1 | * | 2/2013 | Danielyan | G06F 40/268 |
| | | | | 707/741 |

(Continued)

FOREIGN PATENT DOCUMENTS

| | | |
|---|---|---|
| KR | 10-2011-0093785 A | 8/2011 |
| KR | 10-2019-0103011 A | 9/2019 |

OTHER PUBLICATIONS

Steinbach et al., "A Comparison of Document Clustering Techniques", University of Minnesota (Year: 2000).*

*Primary Examiner* — Charles Rones
*Assistant Examiner* — Huen Wong

(57) ABSTRACT

A system for classifying data may include a memory, and a processor configured to determine a scan target including a data group selected from among data groups stored in the memory, based on a result of a comparison between first similarities of data groups stored in the memory and an externally received query, and a minimum value of second similarities of pieces of data included in a data group having a maximum value of the first similarities and the query, and to output, as result data responding to the query, scan data selected depending on a reference number of pieces of scan data from among pieces of scan data in the data group included in the scan target.

15 Claims, 10 Drawing Sheets

(56) References Cited

U.S. PATENT DOCUMENTS

| | | | |
|---|---|---|---|
| 2014/0032567 A1* | 1/2014 | Assadollahi | G06F 16/3347 |
| | | | 707/742 |
| 2014/0280088 A1* | 9/2014 | Speer | G06F 16/3347 |
| | | | 707/723 |
| 2017/0228615 A1* | 8/2017 | Chavez | G06F 18/23213 |
| 2017/0244989 A1* | 8/2017 | Jain | H04N 21/812 |
| 2020/0265241 A1* | 8/2020 | Bruso | G06V 10/763 |
| 2021/0117868 A1* | 4/2021 | Sriharsha | G06F 17/18 |
| 2021/0397610 A1* | 12/2021 | Singh | G06N 3/08 |
| 2022/0043851 A1* | 2/2022 | Yamasaki | G06F 16/355 |

\* cited by examiner

FIG. 3C (1) $A=(a_1, a_2, ..., a_n)$ and $B=(b_1, b_2, ..., b_n)$ (2-1) $\text{similarity} = \cos(\theta) = \dfrac{A \cdot B}{\|A\| \|B\|} = \dfrac{\sum\limits_{i=1}^{n} A_i \times B_i}{\sqrt{\sum\limits_{i=1}^{n} (A_i)^2} \times \sqrt{\sum\limits_{i=1}^{n} (B_i)^2}}$ (2-2) $\text{similarity} = \|A - B\| = \sqrt{\sum_{i=1}^{n}(A_i - B_i)^2}$ sg_1 > sg_3 > sg_2 sd_12 > sd_13 > sd_11

$sd\_12 > sd\_13 > sd\_31 > sd\_11 > sd\_33 > sd\_32$

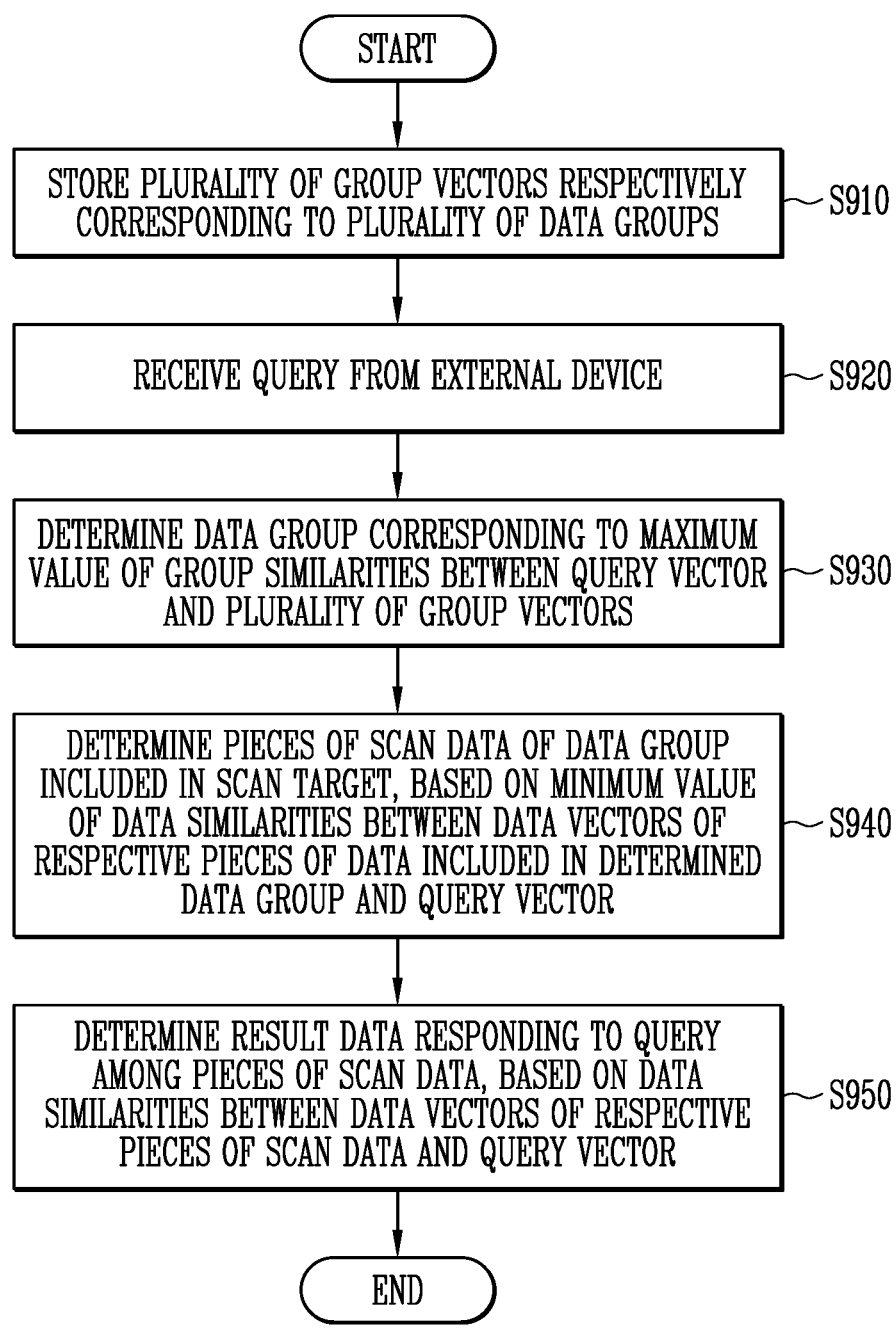

SYSTEM FOR CLASSIFYING DATA BASED ON A CLASSIFICATION ALGORITHM AND METHOD OF OPERATING THE SAME

CROSS-REFERENCE TO RELATED APPLICATION

The present application claims priority under 35 U.S.C. § 119(a) to Korean patent application number 10-2022-0098576, filed on Aug. 8, 2022, in the Korean Intellectual Property Office, the entire disclosure of which is incorporated herein by reference.

BACKGROUND

1. Technical Field

Various embodiments of the present disclosure generally relate to a system and a method of operating the system, and more particularly to a system for classifying data based on a classification algorithm and a method of operating the system.

2. Related Art

A K-nearest neighbor (KNN) algorithm is a classification algorithm for machine learning belonging to supervised learning. When a query is input, the KNN algorithm may select K pieces of data closest (or most similar) to the query and output the selected data as result data. For this operation, there is a need to scan all pieces of data and the scanned data with new data, and thus a problem may arise in that memory access increases and a bottleneck occurs. A solution to overcome such a problem is required.

SUMMARY

Various embodiments of the present disclosure are directed to a system for performing a data classification operation in which memory access is reduced, and a method of operating the system.

An embodiment of the present disclosure may provide for a system. The system may include a memory, and a processor configured to determine a scan target including a data group selected from among data groups stored in the memory, based on a result of a comparison between first similarities of data groups stored in the memory and an externally received query, and a minimum value of second similarities of pieces of data included in a data group having a maximum value of the first similarities and the query, and to output, as result data responding to the query, scan data selected depending on a reference number of pieces of scan data from among pieces of scan data in the data group included in the scan target.

An embodiment of the present disclosure may provide for a system. The system may include a memory, and a processor configured to calculate respective group similarities between a plurality of data groups stored in the memory and a query received from an external device, determine a reference value based on data similarities between pieces of data included in a reference data group having a maximum value of the group similarities, from among the plurality of data groups, and the query, determine a scan target including a data group having a group similarity equal to or greater than the reference value, from among the plurality of data groups, and output, as result data responding to the query, scan data selected depending on a reference number of pieces of scan data, in descending order of data similarities between respective pieces of scan data and the query, from among pieces of scan data included in the scan target.

An embodiment of the present disclosure may provide for a method of operating a system. The method may include storing a plurality of group vectors respectively corresponding to a plurality of data groups, receiving a query from an external device, determining a data group corresponding to a maximum value of group similarities between the query vector of the query and the plurality of group vectors, from among the plurality of data groups, determining pieces of scan data in a data group included in a scan target from among the plurality of data groups based on a minimum value of data similarities between respective data vectors of pieces of data included in the determined data group and the query vector, and determining result data responding to the query among the pieces of scan data based on data similarities between respective data vectors of the pieces of scan data and the query vector.

BRIEF DESCRIPTION OF THE DRAWINGS

FIG. 3C is a diagram illustrating a similarity function according to an embodiment of the present disclosure.

FIG. 9 is a flowchart illustrating a method of operating a system according to an embodiment of the present disclosure.

DETAILED DESCRIPTION

Specific structural or functional descriptions in embodiments of the present disclosure introduced in this specification or application are provided as examples to describe embodiments according to concepts of the present disclosure. The embodiments according to concepts of the present disclosure may be practiced in various forms, and should not be construed as being limited to the embodiments described in the specification or application.

Figure 1:
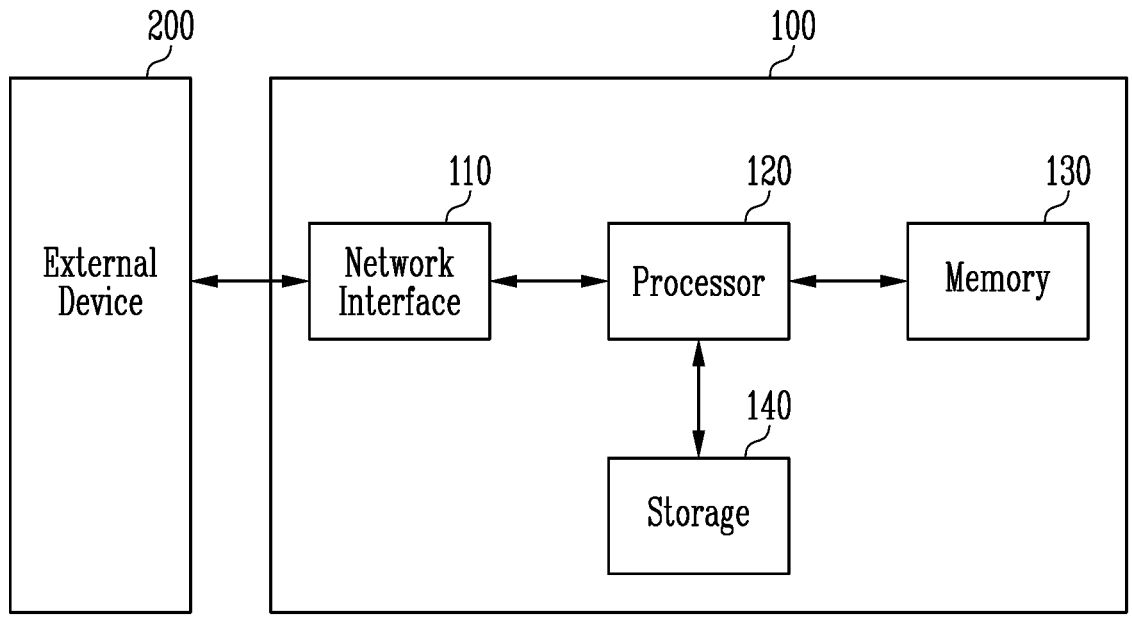
FIG. 1 is a diagram illustrating a system according to an embodiment of the present disclosure.

FIG. 1 is a diagram illustrating a system according to an embodiment of the present disclosure.

Referring to FIG. 1, a system 100 may communicate with an external device 200 over a network. In an embodiment, the system 100 may be a server device, and the external device 200 may be a terminal device of a user. However, in other embodiments the system 100 and the external device 200 are not limited to any specific types or names, and may be implemented as homogeneous or heterogeneous electronic devices. For example, the external device 200 may be implemented as a smartphone, a personal computer (PC), a tablet PC, a television, a set-top box, a smart speaker, a game console, or the like. The system 100 may implemented as a cloud server device, an Intranet server device, an embedded server device, a home server device or the like. In other examples, the system 100 may be implemented as a smartphone, a smart speaker, or the like.

The system 100 may include at least one of a network interface 110, a processor 120, a memory 130, and a storage 140.

The network interface 110 may be a device that is capable of communicating with the external device 200 according to various types of communication standards. For example, the network interface 110 may be implemented as a Bluetooth module that performs Bluetooth communication, a WiFi module that performs WiFi communication, an Ethernet module that performs wired communication, a universal serial bus (USB) module, a thunderbolt module, or the like.

The processor 120 may perform computations or control the overall operation of the system 100. For example, the processor 120 may be implemented as a central processing unit (CPU), an accelerated processing unit (APU), or the like.

The memory 130 may store various types of data. In detail, the memory 130 may load data that can be accessed faster by the processor 120, and may temporarily store the loaded data. Alternatively, the memory 130 may temporarily store data processed by the processor 120. The memory 130 may be implemented, for example, as a dynamic random access memory (DRAM). However, the memory 130 is not limited thereto, and may be modified and practiced in various types of RAMs, such as a static RAM (SRAM), a magnetoresistive RAM (MRAM), a spin-transfer torque MRAM (STT-MRAM), a phase-change RAM (PRAM), a resistive RAM (RRAM), and a ferroelectric RAM (FeRAM).

The storage 140 may store various types of data. In detail, the storage 140 may be a nonvolatile memory in which stored data may be retained even when power is not supplied. For example, the storage 140 may be implemented as a flash memory, a hard disk drive (HDD), a solid state drive (SSD) or the like. Meanwhile, the storage 140 may be implemented as an internal storage device contained in the system 100, or as an external storage device coupled to the system 100 over a network in the form of a direct attach storage (DAS), a network attach storage (NAS), or a storage area network (SAN).

In an embodiment, the memory 130 or the storage 140 may store a plurality of data groups. In an embodiment, the memory 130 or the storage 140 may store a plurality of group vectors respectively corresponding to the plurality of data groups.

Figure 2:
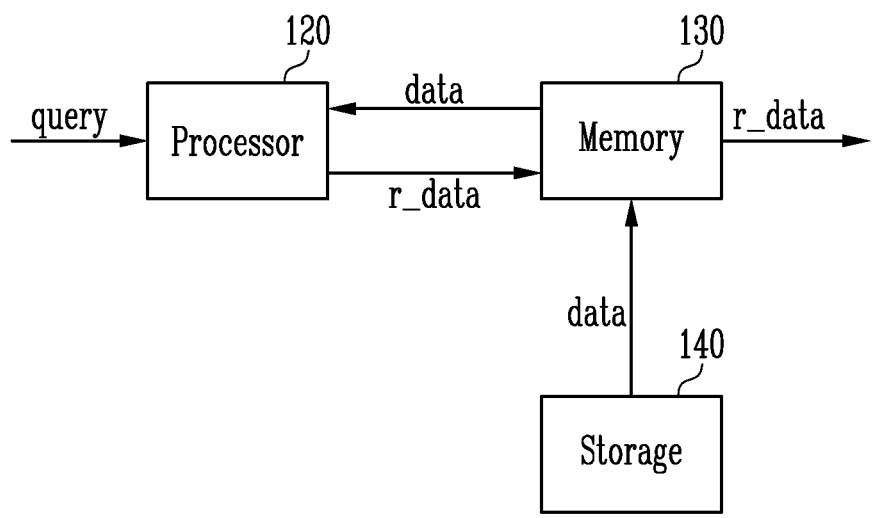
FIG. 2 is a diagram illustrating an operation of a system according to an embodiment of the present disclosure.

FIG. 2 is a diagram illustrating an operation of a system according to an embodiment of the present disclosure.

Referring to FIGS. 1 and 2, the processor 120 may receive a query from outside of the processor 120. Here, the query may be data requesting result data r_data. For example, the query may be data such as an image or a character requesting K images as the result data r_data. In a detailed example, the query may be a request to search for K face pictures most similar to a profile picture. Here, K is a natural number.

Meanwhile, the above are only examples of a query in an embodiment, and in other embodiments, the query may be modified and practiced in various forms.

In FIGS. 1 and 2, the network interface 110 may receive the query from the external device 200. The network interface 110 may transfer the received query to the processor 120 or the memory 130.

When the query is received, the processor 120 may load data stored in the storage 140 into the memory 130. In an example, the data may be stored in the memory 130. Here, the query may be in a state in which it is not classified as any one class, and the data stored in the memory 130 or the storage 140 may be in a state in which it is classified. For example, the data may be classified as one class of data, and may be stored in the memory 130 or the storage 140, with the data being included in a data group. The data may be various types of information such as an image, a character, voice, a value, or an instruction.

In an embodiment, each of different data groups may include pieces of data classified into different classes. For example, one data group may correspond to one class and may include pieces of data classified in that class. That is, after pieces of data are classified into different respective classes, data groups may be generated by grouping the pieces of classified data in the same class into a group. Meanwhile, classes may indicate items (entries) into which pieces of data are classified. For example, respective classes may be defined in advance by a gender, a skin color, a hair color, etc., which are in turn included in different data groups. The above-described classes are only examples, so the classes may be modified and practiced in various forms in different embodiments.

The processor 120 may determine a result data r_data, from among the pieces of data, based on similarities between the query and the pieces of data. Here, the term "similarity" may refer to a quantitative index indicating how similar (or identical) two pieces of data are to each other. For example, the processor 120 may determine K pieces of data having the highest degree of similarity to include in the result data r_data. Further, the processor 120 may store the result data r_data in the memory 130. Alternatively, the processor 120 may control the network interface 110 to transmit the result data r_data to the external device 200, where the result data r_data may be output via the display of the external device 200.

In an embodiment, the processor 120 may determine a scan target, which is one or more data groups selected from among the data groups. To do so, the processor 120 calculates first similarities and second similarities for each data group. Each of the first similarities may be obtained by comparing each of the data groups, and the query. Each of the second similarities may be obtained by comparing each of pieces of data, included in a data group having a maximum value of the first similarities, and the query. The processor 120 may output, as the result data, scan data from the data group selected depending on a reference number of pieces of scan data included in the scan target.

In greater detail, when a query is received, the processor 120 may calculate first similarities between the data groups and the query. A first similarity may be a value indicating how similar the query and a specific data group are to each other. A first similarity may be described as a group similarity.

Further, the processor 120 may calculate second similarities between respective pieces of data included in the data group, from among all of the data groups, that has the maximum value of first similarities and the query. The data group with the greatest value of the first similarities may indicate the data group, from among the plurality of data groups, that is the most similar to the query. The data group with the greatest value of the first similarities may be define as a reference data group. A second similarity may be a value indicating how similar each of the pieces of data, included in the reference data group, and the query are to each other. Here, the second similarity may also be called a data similarity.

In an embodiment, the processor 120 may calculate the first similarities by inputting a query vector of the query and a group vector of corresponding data groups to a similarity function. For example, when a query is received, the processor 120 may extract a query vector from the query. The processor 120 may acquire the first similarities as the result of inputting the query vector and a group vector stored in the memory 130 to the similarity function. The similarity function denotes a function of obtaining a similarity using two vectors. A group vector may represent pieces of data included in one data group.

In an embodiment, the processor 120 may calculate second similarities by inputting data vectors, respectively corresponding to pieces of data included in the data group having the maximum value of the first similarities, and the query vector to the similarity function. For example, the processor 120 may extract respective data vectors from the pieces of data included in the data group having the maximum value of the first similarities. Then, the processor 120 may calculate second similarities by inputting the data vectors and the query vector to the similarity function. In an embodiment, in the same manner as the group vector, which will be described later, respective data vectors for all pieces of data may be extracted in advance and stored in the storage 140.

Each of the query vector, the group vector, and the data vectors may be an n-dimensional vector, where n is a natural number. The n-dimensional vector may include n values.

In an embodiment, the memory 130 may store a plurality of group vectors respectively corresponding to the data groups. For example, the group vectors may be extracted in advance from respective data groups using a K-means algorithm, and may be stored in the storage 140. Further, when the query is received, the processor 120 may load the group vectors stored in the storage 140 into the memory 130. The processor 120 may extract a query vector from the received query. The processor 120 may acquire the first similarities as the result of inputting the query vector and the group vectors, which are stored in the memory 130, to the similarity function.

The processor 120 may select some of all data groups based on the results of a comparison between the first similarities and the minimum value of the second similarities for the data groups. Here, the minimum value of the second similarities reflects the amount of similarity between the query and that data within the data group that is the most different from the query. That is, the processor 120 may select some of all data groups using the minimum value of the second similarities. Further, the processor 120 may determine a scan target including the selected data group.

In an embodiment, the processor 120 may determine the scan target that includes a data group having a first similarity equal to or greater than the minimum value of the second similarities. That is, the data group having a first similarity equal to or greater than a minimum value of the second similarities may be the scan target.

In an embodiment, the scan target excludes a data group, from among all of the data groups, that has a first similarity less than the minimum value of the second similarities. That is, the data group having the first similarity less than the minimum value of the second similarities may be excluded as a scan target.

Furthermore, the processor 120 may select pieces of scan data from among the pieces of scan data of the scan target depending on the reference number of pieces of scan data. The reference number of pieces of scan data may be the number of pieces of scan data requested by a query, or the preset number of pieces of scan data. For example, the reference number may be K. Here, K is a natural number. The scan data may indicate data included in the data group included in the scan target. Further, the processor 120 may determine the selected scan data as the result data r_data responding to the query, and may output the result data r_data.

In an embodiment, the processor 120 may arbitrarily (i.e., randomly) select the scan data from among pieces of scan data included in the scan target depending on the reference number of pieces of scan data.

In an embodiment, the processor 120 may select scan data depending on the reference number of pieces of scan data in descending order of third similarities between the pieces of scan data and the query, from among pieces of scan data included in the scan target. A third similarity may be a value indicating how similar the query and each piece of scan data are to each other. Here, a third similarity may be designated as a data similarity. For example, the processor 120 may select a number of pieces of scan data corresponding to the reference number of pieces of scan data in descending order of the third similarities from among the pieces of scan data, and may determine the selected scan data as the result data r_data.

The processor 120 may control the network interface 110 to transmit the result data r_data to the external device 200. Alternatively, the processor 120 may output the result data r_data to the memory 130 so that the result data r_data is stored in the memory 130.

In accordance with an embodiment of the present disclosure, the processor 120 may determine accurate result data r_data while reducing memory access by scanning partial data rather than all data stored in the memory 130 using the first similarities and the second similarities. In this way, the system 100 may perform a data classification operation in which memory access is reduced while maintaining the accuracy of data classification.

Figure 3A:
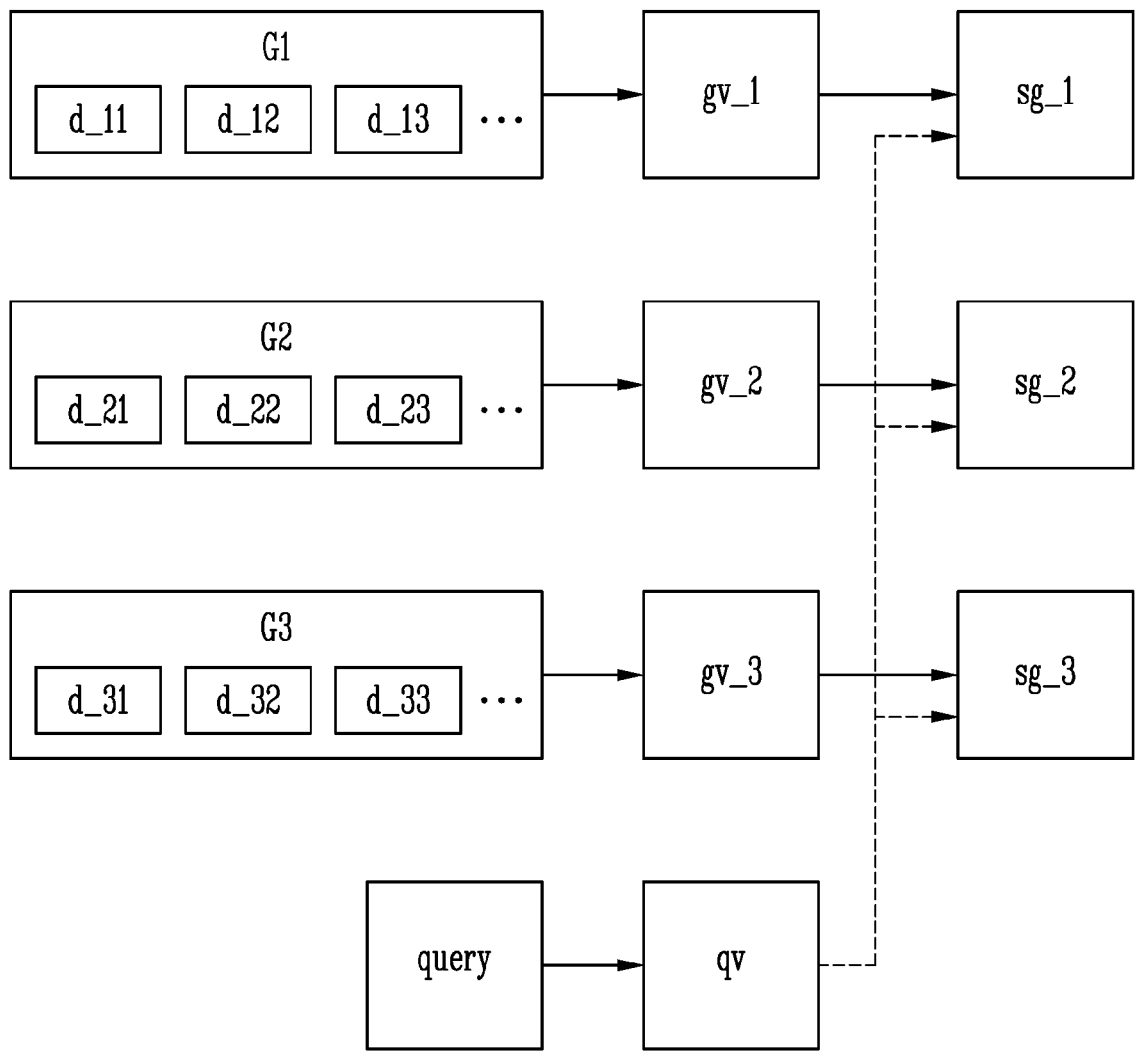
FIG. 3A is a diagram illustrating a process of calculating group similarities according to an embodiment of the present disclosure.

FIG. 3A is a diagram illustrating a process of calculating group similarities according to an embodiment of the present disclosure. A group similarity refers to an above-described first similarity.

Referring to FIG. 3A, a processor 120 may calculate group similarities sg_1 to sg_3 between a plurality of data groups G1 to G3 and a query.

For example, the plurality of data groups G1 to G3 may include pieces of data d_11 to d_13, d_21 to d_23, and d_31 to d_33, which are classified as corresponding classes, respectively. For example, the first data group G1 may include the pieces of data d_11 to d_13, which are classified as a first class of data. The second data group G2 may include the pieces of data d_21 to d_23, which are classified as a second class of data. The third data group G3 may include the pieces of data d_31 to d_33, which are classified as a third class of data. A process of classifying pieces of unclassified data and then grouping the classified data into data groups will be described in detail later with reference to FIG. 3B.

The processor 120 may extract corresponding group vectors gv_1 to gv_3 from the plurality of data groups G1 to G3, respectively. The processor 120 may store the extracted group vectors gv_1 to gv_3 in the memory 130 or the storage 140. Thereafter, when a query is received, the processor 120 may extract a query vector from the query.

The processor 120 may calculate group similarities by inputting the plurality of group vectors gv_1 to gv_3 and the query vector qv to a similarity function. For example, the processor 120 may calculate the first group similarity sg_1 by inputting the first group vector gv_1 and the query vector qv to the similarity function. The processor 120 may calculate the second group similarity sg_2 by inputting the second group vector gv_2 and the query vector qv to the similarity function. The processor 120 may calculate the third group similarity sg_3 by inputting the third group vector gv_3 and the query vector qv to the similarity function. The similarity function will be described in detail later with reference to FIG. 3C.

Figure 3B:
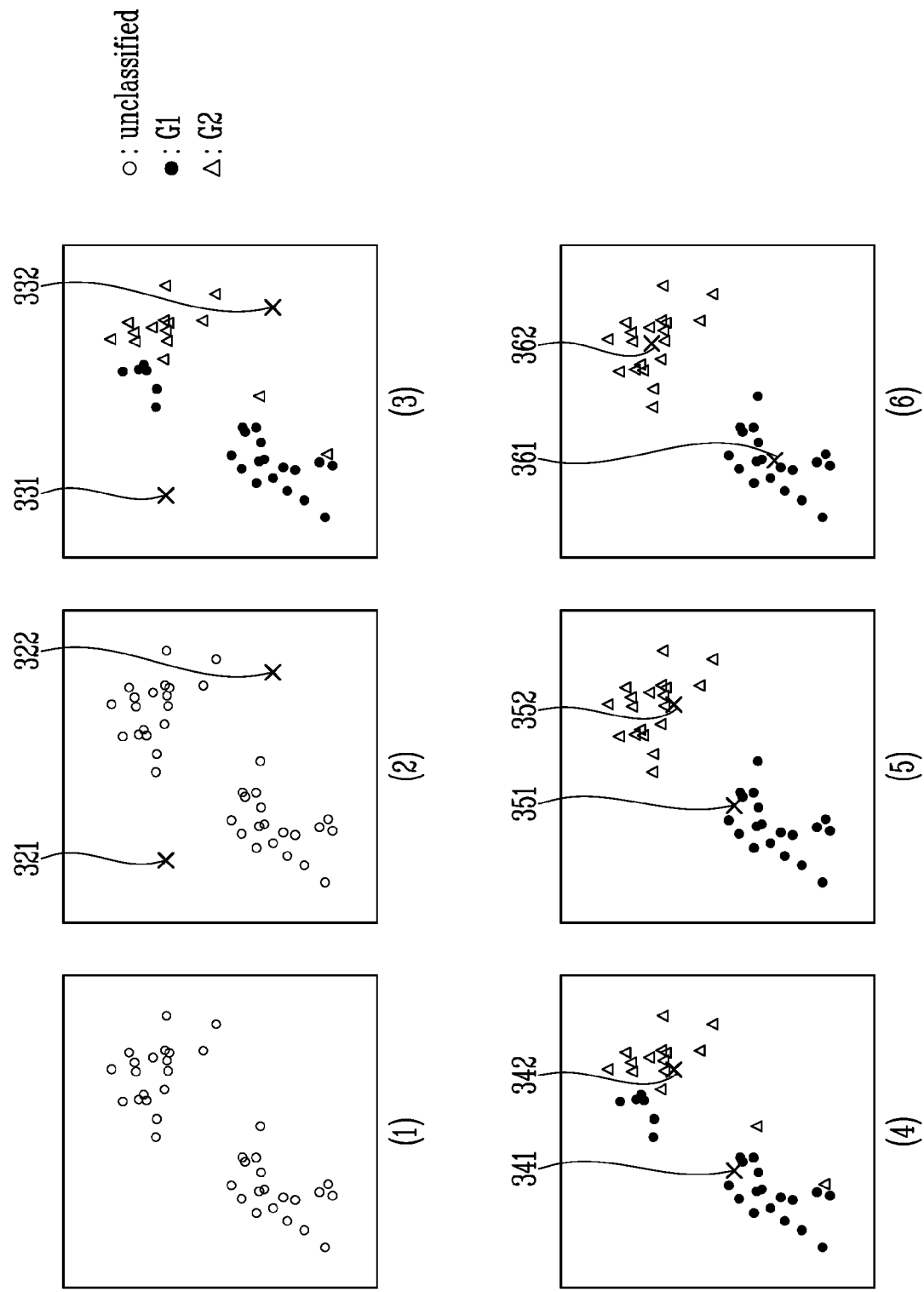
FIG. 3B is a diagram illustrating a method of grouping data groups according to an embodiment of the present disclosure.

FIG. 3B is a diagram illustrating a method of grouping data groups according to an embodiment of the present disclosure.

In FIG. 3B, (1) to (6) show the order of grouping of data groups using a clustering algorithm. The clustering algorithm may correspond to unsupervised learning among machine learning algorithms, and may group pieces of data into respective clusters and classify the data using a scheme for searching for clusters so that elements in the same cluster become similar to each other and elements belonging to different clusters become different from each other.

Referring to (1) in FIG. 3B, the processor 120 may arrange pieces of unclassified data at locations corresponding to data vectors in a vector space.

Referring to (2) in FIG. 3B, the processor 120 may arrange K centroids 321 and 322 at arbitrary locations in a vector space. Here, K is a natural number. K may be equal to the number of data groups G1 and G2. Below, a description will be made on the assumption that K is 2. Referring to (3) in FIG. 3B, the processor 120 may compare respective locations of pieces of unclassified data with the location of each of two centroids 331 and 332, and may then assign each of the pieces of unclassified data to a closer one of the two centroids 331 and 332. For example, pieces of data closer to the first centroid 331 may be assigned to the first centroid 331, and may be classified as a first data group G1 corresponding to the first centroid 331. Pieces of data closer to the second centroid 332 may be assigned to the second centroid 332, and may be classified as a second data group G2 corresponding to the second centroid 332.

The processor 120 may rearrange the locations of the centroids 331 and 332 based on the pieces of data assigned to the two centroids 331 and 332, respectively. For example, the location of the first centroid 331 may be rearranged at the central location of the pieces of data assigned to the first centroid 331 (i.e., pieces of data classified as the first data group G1). The location of the second centroid 332 may also be rearranged using the same manner as the first centroid 331. In FIG. 3B, (4) illustrates rearranged centroids 341 and 342. That is, respective locations of the centroids 331 and 332 may be updated to centroids 341 and 342.

Referring to (5) in FIG. 3B, the processor 120 may assign each of pieces of data to a closer one of a plurality of rearranged centroids 351 and 352. The pieces of assigned data may be reassigned to the closer one of the plurality of centroids 351 and 352 by comparing the locations of the pieces of assigned data with the location of each of the plurality of centroids 351 and 352. That is, the pieces of data classified as the first data group G1 and the second data group G2 may be reclassified.

Again, the processor 120 may rearrange the locations of the plurality of centroids 351 and 352 based on the pieces of data assigned to the two centroids 351 and 352, respectively.

For example, as illustrated in (6) in FIG. 3B, the locations of centroids 361 and 362 may be rearranged. Further, each of the pieces of data may be assigned to a closer one of the plurality of rearranged centroids 361 and 362. This operation may be repeatedly performed until the locations of the centroids 361 and 362 are not changed any further.

Also, the processor 120 may group pieces of data assigned to the one centroid 361 or 362, which is finally determined, into any one data group G1 or G2. In this way, one data group G1 or G2 may include pieces of data, the locations of data vectors of which are adjacent to each other. Also, a vector corresponding to the centroid 361 or 362 of one data group G1 or G2 may be determined to be a group vector. For example, the group vector of the first data group G1 may be a vector corresponding to the first centroid 361. Similarly, the group vector of the second data group G2 may be a vector corresponding to the second centroid 362.

FIG. 3C is a diagram illustrating a similarity function according to an embodiment of the present disclosure.

Referring to (1) in FIG. 3C, A and B denote n-dimensional vectors. Here, n is a natural number. The n-dimensional vector may include n values. For example, each dimension (or element) may denote predefined features such as eyes, nose, or eyebrows, and each value may indicate size, shape, color, or the like. However, this is only an embodiment, and thus features assigned to the dimension of vectors may be modified and practiced in various forms. Meanwhile, A may be a query vector, and B may be a group vector or a data vector.

In an embodiment, the similarity function may be one of a Euclidean distance function and a cosine similarity function.

Referring to (2-1) in FIG. 3C, the similarity function may be a cosine similarity function $\cos(\theta)$. The cosine similarity function $\cos(\theta)$ may denote a function of calculating a similarity using a cosine angle between two vectors. As a result of inputting A and B to the cosine similarity function $\cos(\theta)$, similarity may be calculated. Here, the similarity may be a scalar value.

Referring to (2-2) in FIG. 3C, the similarity function may be a Euclidean distance function $\|A-B\|$. The Euclidean distance function $\|A-B\|$ may be a function of calculating a similarity using the distance between two points in a space. As a result of inputting A and B to the Euclidean distance function $\|A-B\|$, the similarity may be calculated. Here, the similarity may be a scalar value.

The above-described embodiments are for illustration only, and in other embodiments the similarity function may be modified into any one of various functions such as Jaccard Distance, Mahalanobis Distance, Hamming Distance, Manhattan Distance, and Minkowski Distance functions.

Figure 4:
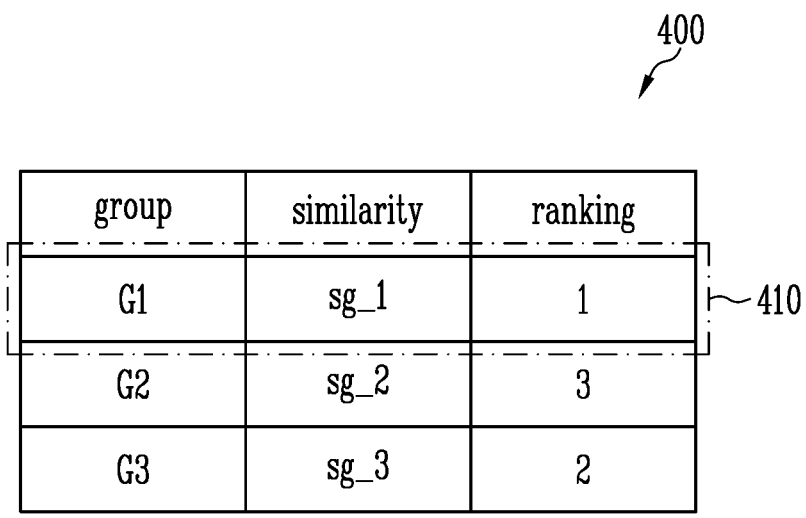
FIG. 4 is a diagram illustrating a process of determining data groups depending on group similarities according to an embodiment of the present disclosure.

FIG. 4 is a diagram illustrating a process of determining data groups depending on group similarities according to an embodiment of the present disclosure.

Referring to FIG. 4, a processor 120 may determine a data group having a maximum value of the group similarities sg_1 to sg_3, from among the plurality of data groups G1 to G3, to be a reference data group 410. Thus, the data group most similar to a query can be designated as the reference data group 410, and the processor 120 preferentially scans all pieces of data included in the reference data group 410.

For example, a first table 400 shows the results of calculation of the group similarities sg_1 to sg_3 between the query and respective data groups G1 to G3 by the processor 120. Here, it is assumed that the first group similarity sg_1 is the highest, the third group similarity sg_3 is the next highest, and the second group similarity sg_2 is the lowest.

In this example, the processor 120 may assign rankings to respective group similarities sg_1 to sg_3 or align the group similarities sg_1 to sg_3 depending on the relative magnitudes of the group similarities sg_1 to sg_3. The processor 120 may determine that the first data group G1 has a maximum value of the group similarities sg_1 to sg_3, that is, the first group similarity sg_1, so the first data group G1 would be the reference data group 410 depending on such rankings or alignment.

Hereinafter, a description will be made on the assumption that the reference data group 410 is the first data group G1.

Figure 5:
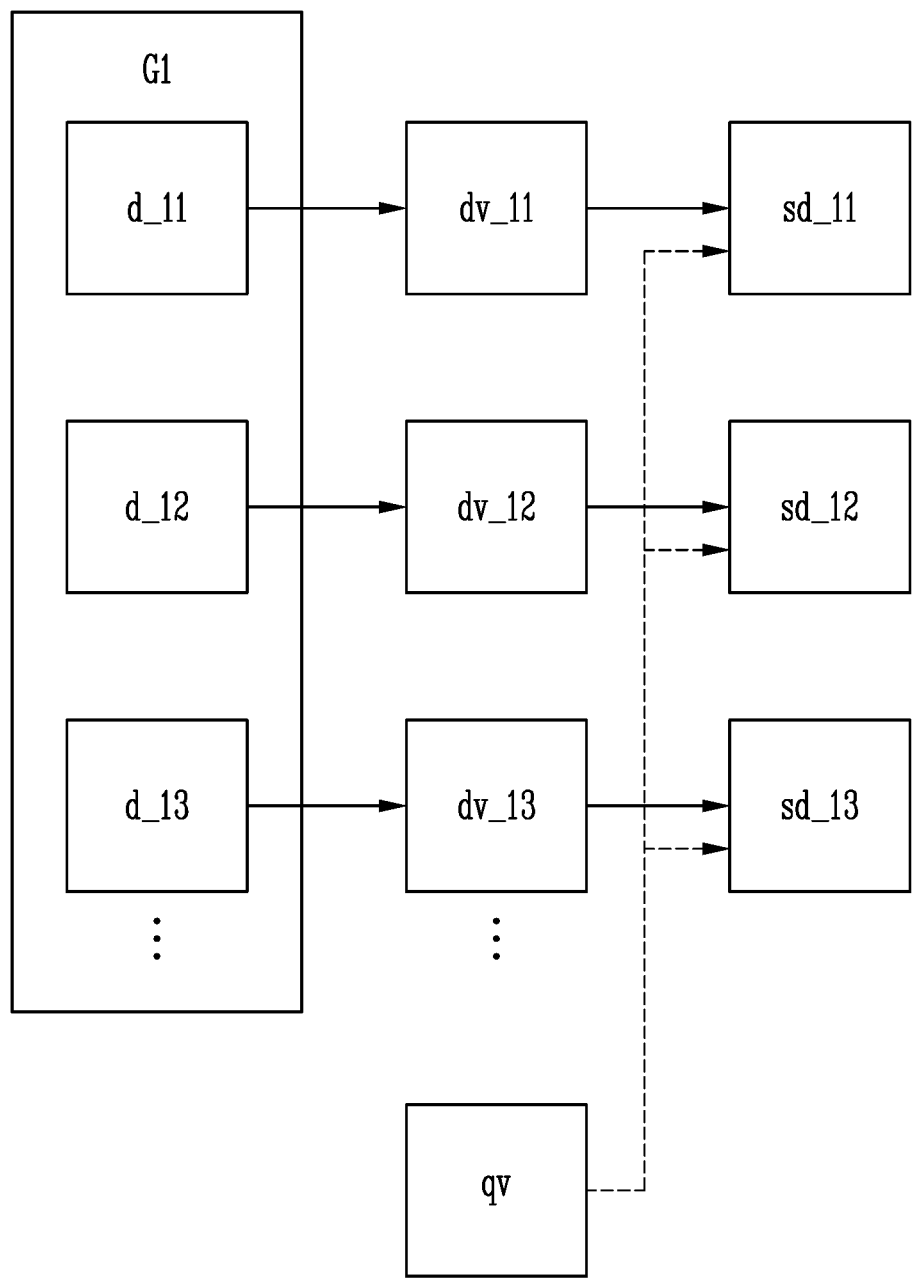
FIG. 5 is a diagram illustrating a process of calculating data similarities according to an embodiment of the present disclosure.

FIG. 5 is a diagram illustrating a process of calculating data similarities according to an embodiment of the present disclosure.

Referring to FIG. 5, the processor 120 may calculate data similarities sd_11 to sd_13 between pieces of data d_11 to d_13, included in a first data group G1, which has a maximum value of group similarity from among data groups G1 to G3, and a query. Here, the first data group G1 may be selected to be a reference data group 410.

The processor 120 may calculate data similarities sd_11 to sd_13 between respective data vectors dv_11 to dv_13 of the pieces of data d_11 to d_13 included in the first data group G1 and a query vector qv of the query. The data vectors dv_11 to dv_13 may be extracted from respective pieces of data d_11 to d_13 included in the first data group G1. The query vector qv may be extracted from the query. Meanwhile, as a scheme for extracting a vector from the query or data, various algorithms such as a convolutional neural network (CNN) or mel frequency cepstral coefficient (MFCC) algorithm may be used.

The processor 120 may calculate data similarities sd_11 to sd_13 by inputting the data vectors dv_11 to dv_13 and the query vector qv to a similarity function. For example, the processor 120 may calculate the similarity function using the first data vector dv_11 and the query vector qv as parameters of the similarity function, and may acquire the first data similarity sd_11, which is the result of calculation of the similarity function. Similarly, the processor 120 may acquire the second data similarity sd_12 and the third data similarity sd_13. Since a description of the similarity function overlaps that of FIG. 3C and related portions thereof, a detailed description thereof will be omitted.

Figure 6:
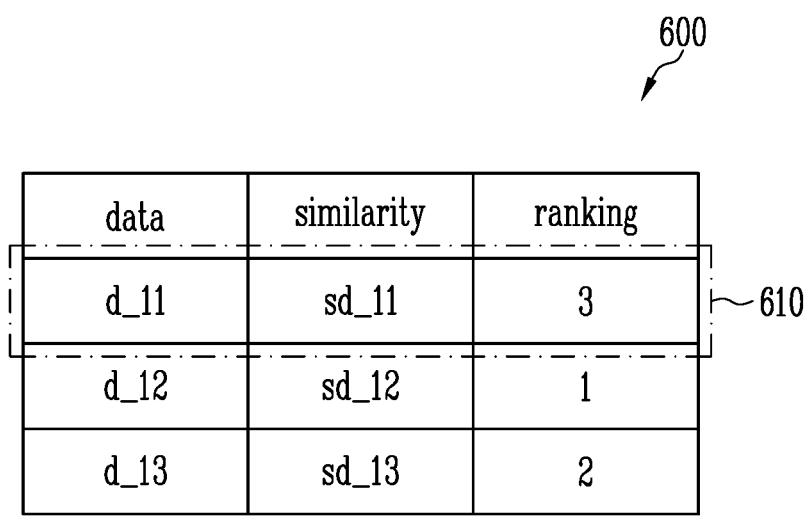
FIG. 6 is a diagram illustrating a process of determining a minimum value of data similarities according to an embodiment of the present disclosure.

FIG. 6 is a diagram illustrating a process of determining a minimum value of data similarities according to an embodiment of the present disclosure.

Referring to FIG. 6, the processor 120 may determine the minimum value of data similarities sd_11 to sd_13 for respective pieces of data d_11 to d_13 included in a first data group G1 to be a reference value 610. Here, the first data group G1 may be a data group having a maximum value of group similarities from among the plurality of data groups G1 to G3. Here, the reference value 610 denotes a similarity between the query and a piece of data that is the most different from the query within the data group that is the most similar to the query, and is a value that is a criterion for determining whether to scan other data groups.

In an example, it is assumed that the second data similarity sd_12 is the highest, the third data similarity sd_13 is the next highest, and the first group similarity sd_11 is the lowest.

The processor 120 may assign rankings to respective data similarities sd_11 to sd_13 or align the data similarities sd_11 to sd_13 depending on the relative magnitudes of the data similarities sd_11 to sd_13 for respective pieces of data d_11 to d_13 included in the first data group G1. For example, as shown in a second table 600, the data similarities sd_11 to sd_13, reflecting similarity between the query and the respective pieces of data d_11 to d_13, may be calculated by the processor 120, and the results of assigning rankings to the data similarities may be shown.

The processor 120 may determine the first data similarity sd_11, which is the minimum value among the data similarities sd_11 to sd_13, to be the reference value 610 depending on the rankings or alignment. Hereinafter, a description will be made assuming that the reference value 610 is the first data similarity sd_11.

Figure 7:
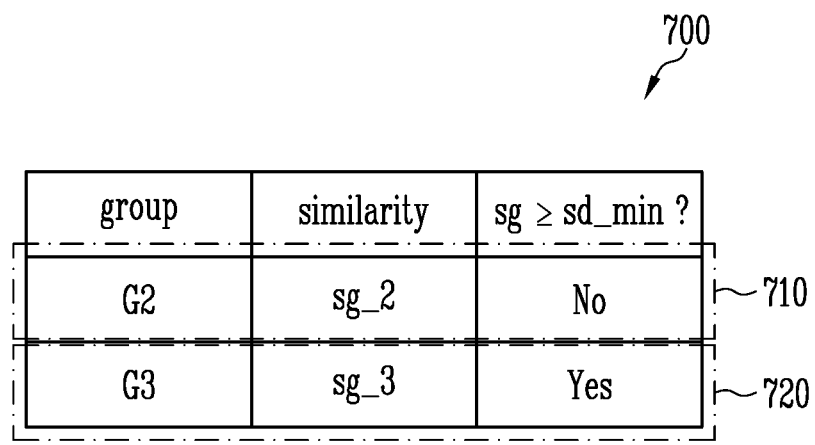
FIG. 7 is a diagram illustrating a process of determining a scan target according to an embodiment of the present disclosure.

FIG. 7 is a diagram illustrating a process of determining a scan target according to an embodiment of the present disclosure.

Referring to FIG. 7, a processor 120 may determine a scan target that includes a data group having a group similarity equal to or greater than a reference value sd_min, from among a plurality of data groups G1 to G3.

For example, the processor 120 may compare the magnitudes of group similarities sg_2 and sg_3 for data groups G2 and G3 with the magnitude of the reference value sd_min. The data groups G2 and G3 may be the remaining data groups other than a reference data group, from among the plurality of data groups G1 to G3. The reference data group may be the first data group G1 having a maximum value of the group similarities sg_1 to sg_3. The reference value sd_min may be a minimum value of the data similarities sd_11 to sd_13 for pieces of data d_11 to d_13 included in the first data group G1.

In an embodiment, the processor 120 may determine a scan target from which a data group 710 having a group similarity less than the reference value sd_min is excluded. For example, the processor 120 may exclude the second data group G2 having a second group similarity sg_2, which is less than the reference value sd_min, from selection as the scan target.

In an embodiment, the processor 120 may determine a scan target in which a data group 720 having a group similarity equal to or greater than the reference value sd_min is included. For example, the processor 120 may allow a third data group G3 having a third group similarity sg_3 equal to or greater than the reference value sd_min to be included in the scan target.

In an embodiment, the processor 120 may allow the first data group G1, determined to be the reference data group, to be included in the scan target. Here, data similarities sd_11 to sd_13 between the pieces of data d_11 to d_13 included in the first data group G1 and the query may be previously calculated and stored in the memory 130. For example, the first table 400 of FIG. 4 may be stored in the memory 130.

In FIG. 7, as shown in a third table 700, the second data group G2 may be excluded from the scan target, and the third data group G3 may be included in the scan target. The processor 120 may calculate data similarities between respective pieces of data d_31 to d_33 included in the third data group G3 and the query. For example, as described above with reference to FIG. 5, the processor 120 may calculate the data similarities by inputting respective data vectors of the pieces of data d_31 to d_33 and the query vector qv to the similarity function. Also, the processor 120 may determine result data r_data by comparing the previously calculated data similarities sd_11 to sd_13 between the pieces of data d_11 to d_13 in the first data group G1 and the query with the data similarities between the pieces of data d_31 to d_33 in the third data group G3 and the query. A detailed description thereof will be made below with reference to FIG. 8.

Figure 8:
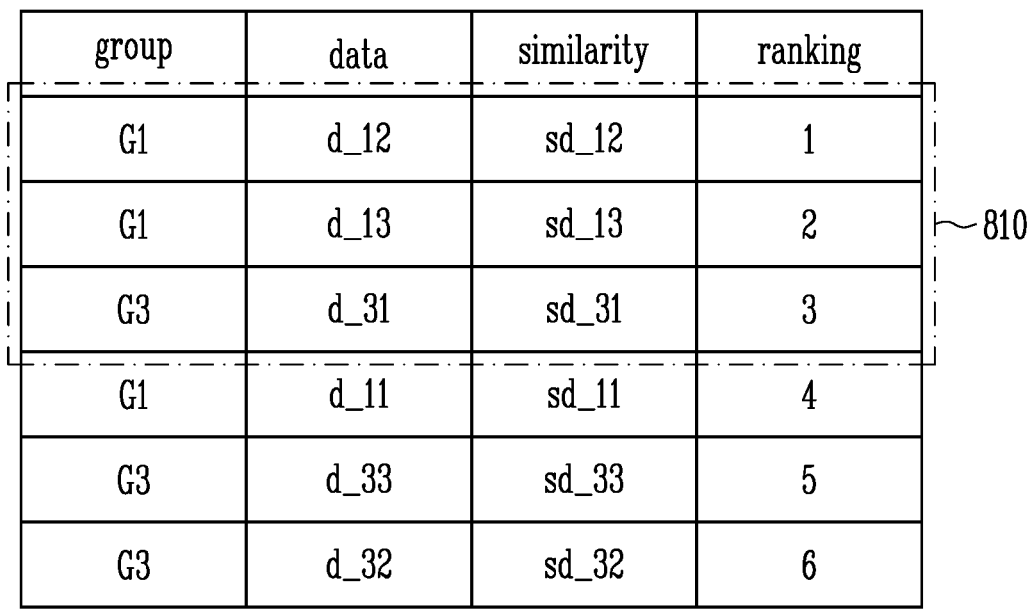
FIG. 8 is a diagram illustrating a process of determining result data according to an embodiment of the present disclosure.

FIG. 8 is a diagram illustrating a process of determining result data according to an embodiment of the present disclosure.

Referring to FIG. 8, a processor 120 may compare the magnitudes of data similarities sd_11 to sd_13 and sd_31 to sd_33 for pieces of data d_11 to d_13 and d_31 to d_33 included in the first data group G1 and the third data group G3, which are included in the scan target, with each other. Meanwhile, the data similarities sd_11 to sd_13 and sd_31 to sd_33 for the pieces of data included in the scan target may be designated as third similarities.

The processor 120 may assign rankings to the data similarities sd_11 to sd_13 and sd_31 to sd_33 or align the data similarities sd_11 to sd_13 and sd_31 to sd_33 depending on the relative magnitudes of the data similarities sd_11 to sd_13 and sd_31 to sd_33. Here, the aligned results may be indicated, as shown in a fourth table 800.

Further, the processor 120 may select pieces of data in descending order of the data similarities sd_11 to sd_13 and sd_31 to sd_33 (i.e., descending order of rankings) from among the pieces of data d_11 to d_13 and d_31 to d_33 included in the scan target. The reference number of pieces of data may be the number of pieces of data requested by the query, or the preset number of pieces of data. For example, the reference number may be 3.

The processor 120 may select three pieces of data d_12, d_13, and d_31 in descending order of data similarities, and may determine the selected pieces of data to be the result data 810. The processor 120 may output the result data 810 to the memory 130 or the network interface 110.

FIG. 9 is a flowchart illustrating a method of operating a system according to an embodiment of the present disclosure.

Referring to FIG. 9, a method of operating a system 100 may include storing a plurality of group vectors respectively corresponding to a plurality of data groups at step S910, receiving a query from an external device 200 at step S920, determining a data group corresponding to a maximum value of group similarities between a query vector of the query and the plurality of group vectors, from among the plurality of data groups, at step S930, determining pieces of scan data in a data group included in a scan target from among the plurality of data groups based on a minimum value of data similarities between data vectors of respective pieces of data included in the determined data group and the query vector at step S940, and determining result data responding to the query among the pieces of scan data based on data similarities between data vectors of respective pieces of scan data and the query vector at step S950.

The plurality of group vectors respectively corresponding to the plurality of data groups may be stored at step S910. Each data group may include pieces of data corresponding to classes. A group vector may be a vector representing the corresponding data group or pieces of data included in the data group.

Further, the query may be received from the external device 200 at step S920. The query may be data indicating a request of a user.

A data group corresponding to the maximum value of group similarities between the query vector of the query and the plurality of group vectors may be determined from among the plurality of data groups at step S930. The query vector may be obtained by converting the query into a vector.

At step S940, pieces of scan data of a data group included in the scan target may be determined based on the minimum value of data similarities between data vectors of respective pieces of data included in the determined data group and the query vector.

In an embodiment, step S940 of determining the pieces of scan data may include determining a scan target that includes a data group having a group similarity equal to or greater than the minimum value, among the plurality of data groups.

In an embodiment, step S940 of determining the pieces of scan data may include determining a scan target from which a data group having a group similarity less than the minimum value is excluded from the plurality of data groups.

Also, based on data similarities between the data vectors of the respective pieces of scan data and the query vector, result data responding to the query may be determined among the pieces of scan data at step S950.

In an embodiment, step S950 of determining the result data may include determining result data selected depending on the reference number of pieces of scan data in descending order of data similarities between the data vectors of the respective pieces of scan data and the query vector, among the pieces of scan data.

In an embodiment, the method of operating the system 100 may further include transmitting the result data to the external device 200 or storing the result data in the memory 130 after determining the result data at step S950.

In an embodiment, the method of operating the system 100 may further include, before storing the plurality of group vectors at step S910, grouping the pieces of data stored in the memory 130 into the plurality of data groups.

In a detailed embodiment, a plurality of centroids may be arranged at arbitrary locations in a vector space, and pieces of data may be arranged at locations corresponding to respective data vectors. Further, each of the pieces of data may be assigned to a closer one of the plurality of centroids.

Also, based on respective pieces of data assigned to the plurality of centroids, the locations of the plurality of centroids may be rearranged. That is, the locations of the centroids may be updated to other locations. For example, the locations of the centroids may be rearranged at the central locations of pieces of data to which the corresponding centroids are assigned. Further, each of the pieces of data may be assigned to a closer one of the plurality of rearranged centroids. Meanwhile, the step of rearranging the plurality of centroids and the step of assigning each piece of data to a closer centroid may be repeatedly performed until the locations of the centroids caused by rearrangement are not changed any further.

Furthermore, pieces of data assigned to one centroid may be grouped into one data group, among the plurality of data groups.

In accordance with an embodiment of the present disclosure, there may be provided a system for performing a data classification operation in which memory access is reduced, and a method of operating the system.

What is claimed is:

1. A system, comprising:
a memory configured to store a plurality of data groups, each data group represented by one of a plurality of group vectors and each data group including data; and
a processor configured to:
determine first similarities between a query received from an external device and each of the plurality of group vectors,
determine a reference data group, from among the plurality of data groups, associated with the highest first similarity from the determined first similarities,
determine second similarities between the query and each of the data included in the reference data group to identify the lowest second similarity from the determined second similarities,
exclude a first similarity of the reference data group from the determined first similarities resulting in a subset of the determined first similarities,
comparing the subset of the determined first similarities with the lowest second similarity,
determine data groups associated with the subset of the determined first similarities that have a first similarity value equal to or greater than the lowest second similarity, and
output, as target data responding to a reference number of data requested by query, the reference number of data in descending order of data similarities between each of the data, the target data comprises only data from the reference data group and the data groups associated with the subset of the determined first similarities that are equal to or greater than the lowest second similarity.

2. The system according to claim 1, wherein:
the memory stores the plurality of group vectors, and
the processor is configured to determine the first similarities by inputting a query vector corresponding to the query and each of the plurality of group vectors into a similarity function when the query is received.

3. The system according to claim 2, wherein the similarity function comprises one of a Euclidean distance function and a cosine similarity function.

4. The system according to claim 2, wherein the processor is configured to determine the second similarities by inputting respective data vectors, corresponding to each of the data included in the reference data group, and the query vector to the similarity function.

5. The system according to claim 1, further comprising a network interface,
wherein the processor is configured to
determine a reference number of data requested by the query,
determine, in descending order, third similarities between the query and each of the data included in the target data, and
control the network interface to transmit, to the external device, the reference number of data from the target data based on the descending order of third similarities.

6. The system according to claim 1, wherein each of the plurality of data groups includes data classified into corresponding classes.

7. A system, comprising:
a memory configured to store a plurality of data groups; and
a processor configured to:
determine group similarities between each of a plurality of group vectors respectively representing the plurality of data groups and a query received from an external device,
determine a reference data group, from among the plurality of data groups, having a maximum value of the determined group similarities,
determine data similarities between each of data included in the reference data group and the query,
determine a minimum value of the determined data similarities as a reference value,
exclude the reference data group from the plurality of data groups to determine a first remainder of the plurality of data groups,
compare the group similarities of the first remainder of the plurality of data groups with the reference value,
determine a second remainder from the first remainder of the plurality of data groups excluding data groups having a group similarity less than the reference value, and
output, as result data responding to a reference number of data requested by the query, the reference number of data in descending order of data similarities between each of the data, included in the reference data group and the second remainder of the plurality of data groups, and the query.

8. The system according to claim 7, wherein the processor is configured to:
determine the group similarities by inputting each of the plurality of group vectors and a query vector corresponding to the query into a similarity function, and
determine the data similarities between each of data included in the reference data group and the query by inputting respective data vectors of each of data included in the reference data group and the query vector into the similarity function.

9. The system according to claim 8, wherein the similarity function comprises one of a Euclidean distance function and a cosine similarity function.

10. The system according to claim 7, further comprising:
a storage configured to store the plurality of data groups,
wherein the processor is configured to load the plurality of data groups stored in the storage, into the memory when the query is received.

11. A method of operating a system, comprising:
storing a plurality of group vectors respectively representing a plurality of data groups;
receiving a query from an external device;
determining group similarities between a query vector of the query and each of the plurality of group vectors;
determining a reference data group having a maximum value of the determined group similarities, from among the plurality of data groups;
determining data similarities between respective data vectors of each of data included in the reference data group and the query vector and selecting a minimum value of the data similarities as a reference value;
excluding the group similarity of the reference data group from the determined group similarities to result in a remainder of group similarities;
comparing the group similarities of the remainder of group similarities with the reference value;
determining at least one data group having a group similarity equal to or greater than the reference value, from among the plurality of data groups;
determining each of data included in the at least one data group from among the plurality of data groups; and determining result data responding to the query from among the data included in the at least one data group based on data similarities between respective data vectors of each of the data included in the at least one data group and the query vector;

output, as result data responding to a reference number of data requested by the query, the reference number of data in descending order of data similarities between each of the data, included in the reference data group and the remainder of group similarities, and the query.

12. The method according to claim 11, wherein determining the result data comprises:

selecting a reference number of data, based on the query, from data included in the at least one data group in descending order of the data similarities between the respective data vectors of the data included in the at least one data group and the query vector.

13. The method according to claim 11, further comprising:

grouping each of data stored in a memory into the plurality of data groups.

14. The method according to claim 13, wherein the grouping comprises:

arranging a plurality of centroids at arbitrary locations in a vector space, and arranging each of the data at locations respectively corresponding to the data vectors;

assigning each of the data to a closer one of the plurality of centroids;

rearranging locations of the plurality of centroids based on each of the of data assigned to each of the plurality of centroids;

assigning each of the data to a closer one of the plurality of rearranged centroids; and grouping each of the data assigned to one centroid into one of the plurality of data groups.

15. The method according to claim 11, further comprising:

transmitting the result data to the external device or storing the result data in a memory.

* * * * *